(12) United States Patent  (10) Patent No.: US 7,963,732 B2
Stager et al.  (45) Date of Patent: Jun. 21, 2011

(54) THREADED FASTENER

(75) Inventors: Joseph Edward Stager, Valley City, OH (US); James Richard Johnston, Bethel Park, PA (US); Charles Whitehill Friday, Pittsburgh, PA (US)

(73) Assignee: Triangle Fastener Corporation, Pittsburgh, PA (US)

( * ) Notice: Subject to any disclaimer, the term of this patent is extended or adjusted under 35 U.S.C. 154(b) by 493 days.

(21) Appl. No.: 12/108,575

(22) Filed: Apr. 24, 2008

(65) Prior Publication Data

US 2009/0269161 A1 Oct. 29, 2009

(51) Int. Cl.
 *F16B 39/30* (2006.01)
(52) U.S. Cl. .................. 411/310; 411/411; 411/938
(58) Field of Classification Search .......... 411/308–310, 411/411, 938
 See application file for complete search history.

(56) References Cited

U.S. PATENT DOCUMENTS

| | | | | |
|---|---|---|---|---|
| 612,370 | A | * | 10/1898 | Wall ............................... 411/259 |
| 756,269 | A | * | 4/1904 | MaMahon ..................... 411/285 |
| 1,070,247 | A | * | 8/1913 | Haines ........................... 411/259 |
| 2,177,004 | A | | 10/1939 | Purtell |
| 2,177,005 | A | | 10/1939 | Purtell |
| 2,349,591 | A | * | 5/1944 | Hosking ........................ 411/302 |
| 3,124,188 | A | | 3/1964 | Muenchinger |
| 3,459,250 | A | * | 8/1969 | Tabor ............................. 411/310 |
| 3,481,380 | A | | 12/1969 | Breed |
| 3,661,194 | A | | 5/1972 | Macfarlane et al. |
| 4,161,132 | A | | 7/1979 | Eklund et al. |
| 4,637,767 | A | | 1/1987 | Yaotani et al. |
| 5,304,023 | A | | 4/1994 | Toback et al. |
| 5,340,253 | A | * | 8/1994 | Stencel ........................ 411/310 |
| 5,672,037 | A | | 9/1997 | Iwata |
| 5,746,039 | A | | 5/1998 | Nystrom |
| 6,302,629 | B1 | | 10/2001 | Hsiao |
| 6,468,014 | B2 | | 10/2002 | Chen |
| 6,676,352 | B2 | * | 1/2004 | Chen-Chi et al. ............. 411/417 |
| 6,974,289 | B2 | | 12/2005 | Levey et al. |
| 6,976,818 | B2 | | 12/2005 | Levey et al. |
| 7,063,491 | B2 | | 6/2006 | French |
| 7,090,453 | B2 | | 8/2006 | Lin |
| 7,101,133 | B2 | | 9/2006 | Dicke |
| 7,326,014 | B2 | * | 2/2008 | Levey et al. ................... 411/308 |

(Continued)

FOREIGN PATENT DOCUMENTS

GB 1209225 10/1970

OTHER PUBLICATIONS

Acument Global Technologies, "Powergrip Fasteners for Layered Assemblies." Feb. 2007. Acument Intellectual Properties, LLC. Sterling Heights, Michigan.

(Continued)

*Primary Examiner* — Flemming Saether
(74) *Attorney, Agent, or Firm* — The Webb Law Firm

(57) ABSTRACT

A fastener is provided including an elongated body having a first end and a second end, and a helical thread formed on at least a portion of the elongated body where the thread has a crest, a root, and flank portions. The helical thread has at least one protrusion extending from the crest and flank portions toward the first end of the elongated body, and each protrusion has a peak that extends to the root of the thread.

7 Claims, 7 Drawing Sheets

U.S. PATENT DOCUMENTS

2004/0101381 A1    5/2004   Kram et al.
2005/0175432 A1    8/2005   Su

OTHER PUBLICATIONS

Acument Global Technologies, "Taptite 2000 Fasteners Featuring the Innovative Radius Profile Thread." Feb. 2007. Acument Intellectual Properties, LLC. 2007. Sterling Heights, Michigan.

Acument Global Technologies, "Fastite 2000 Thread-Rolling Fasteners for Sheet Metal." Feb. 2007. Acument Intellectual Properties, LLC. 2007. Sterling Heights, Michigan.

ITW Shakeproof Industrial Products, "GX Self-Extruding Screws." 2007. Illinois Toolworks.

ITW Shakeproof Industrial Products, "Bosscrew Fasteners." 2007. Illinois Toolworks.

* cited by examiner

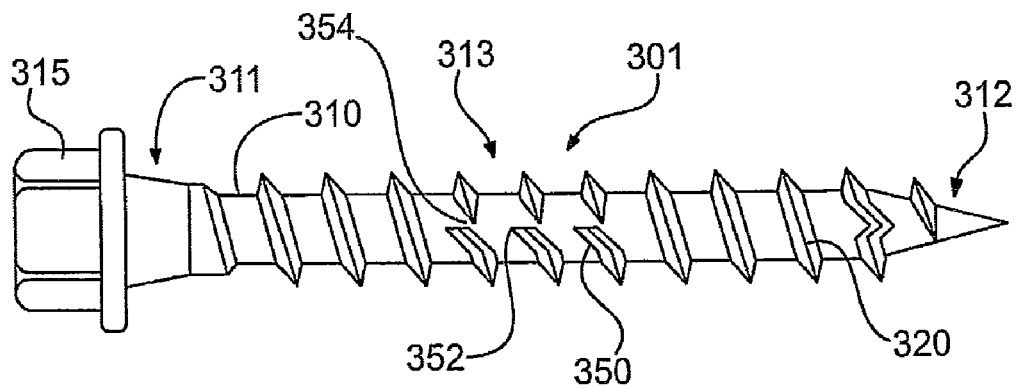
Fig. 17
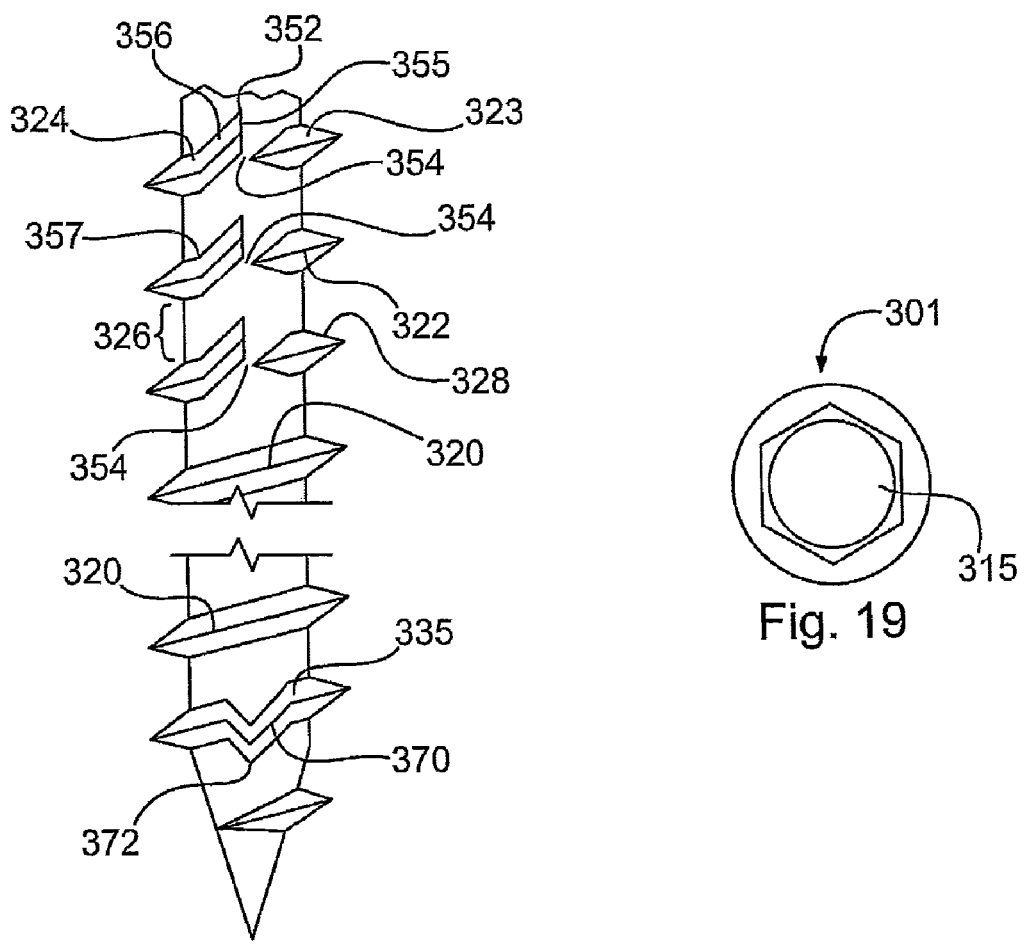
Fig. 18
Fig. 19

THREADED FASTENER

BACKGROUND OF THE INVENTION

1. Field of the Invention

This invention relates to fasteners, and more particularly to threaded fasteners having threads that diminish the likelihood of the fasteners becoming loose after installation.

2. Description of Related Art

With presently available screws that are used to fasten thin metal materials together, the difference between drive torque and strip torque is typically very small. Due to this small differential, it is difficult to install these screws with an effective clamping torque range using a power screwdriver. During installation, tapping torque and clamping torque is generated by friction from the flank portion and root of the thread contacting the thin metal. When the fastener is tightened, the hole in the thin metal begins to enlarge from the root of the thread, and torque beings to drop. This results in many screws being installed with a low clamping force. In applications where the fastener is secured in wood, the wood fibers shrink and lose their ability to hold the thread engagement securely. This results in fastener back-out, which causes failure of the fastened joint. Many different forces affect a screw fastened joint during service, and low clamping torque is the primary reason screws loosen. A threaded fastener that loosens creates a condition that adversely affects the performance of joints and causes fastener and joint failures.

U.S. Pat. No. 2,177,004 to Purtell discloses a screw having locking means formed in the thread, whereby the screw is effectually prevented from loosening when threaded into a companion member.

U.S. Pat. No. 3,661,194 to Macfarlane et al. discloses a prevailing torque fastener of the type that generally includes a threaded section having axially extending projections spaced along a flank of the thread, which projections engage the thread of a mating member with an interference fit.

SUMMARY OF THE INVENTION

In one embodiment, a fastener is provided including an elongated body having a first end and a second end, and a helical thread formed on at least a portion of the elongated body where the thread has a crest, a root, and flank portions. The helical thread has at least one protrusion extending from the crest and flank portions toward the first end of the elongated body, and each protrusion has a peak that extends to the root of the thread. Each protrusion may have a first side and a second side, where the first side has an angle of at least about 90 degrees with respect to an upper portion of the helical thread adjacent to each protrusion, and the second side has an angle of at least about 90 degrees with respect to a lower portion of the helical thread adjacent to each protrusion. The peak of each protrusion may have a height of at least 50 percent of the root length from an intersection point of the root and flank portion closest to the first end of the elongated body. Each protrusion may be an inverted V-shaped extension of the crest and flank portions of the helical thread. Further, each protrusion may define an interruption in the helical thread. The first end of the elongated body may include a head for driving the fastener. The peak of each protrusion may be pointed.

In certain embodiments, the helical thread includes a plurality of protrusions spaced equally apart around the circumference of the elongated body on a first full thread beginning at the first end of the elongated body. The helical thread may also have at least one set of protrusions, with each set having a plurality of protrusions spaced equally apart around the circumference of the elongated body. The first set of protrusions may be located on a first full thread at the first end of the elongated body with the remaining sets of protrusions located on adjacent threads. Further, each protrusion of each set may be aligned with a corresponding protrusion of the other sets of protrusions, such that corresponding protrusions of the sets of protrusions are aligned with a longitudinal axis extending from the first end of the elongate body to the second end of the elongate body.

In another embodiment, the helical thread of the fastener may include at least one downward protrusion extending from the crest and flank portions toward the second end of the elongated body, and each downward protrusion has a peak that extends to the root of the thread. Each downward protrusion may be provided on a last full thread at the second end of the elongated body.

BRIEF DESCRIPTION OF THE DRAWINGS

FIG. 17 is a side view of a threaded fastener pursuant to another embodiment;

FIG. 18 is a partial front view of the fastener shown in FIG. 17; and

FIG. 19 is a top view of the fastener shown in FIG. 17.

DESCRIPTION OF PREFERRED EMBODIMENTS

Figure 1:
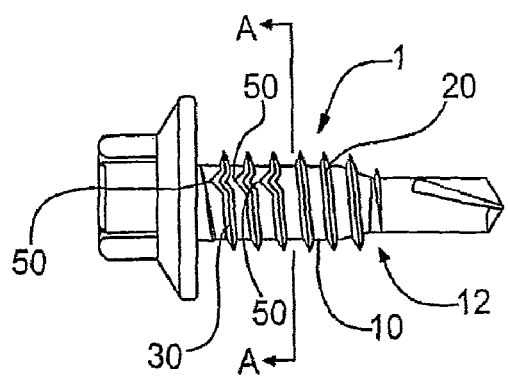
FIG. 1 is a side view of a threaded fastener pursuant to one embodiment.
Figure 2:
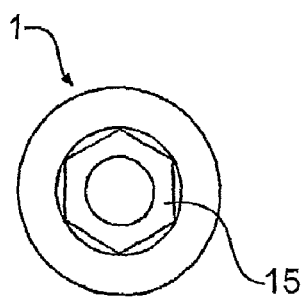
FIG. 2 is a top view of the fastener shown in FIG. 1.
Figure 3:
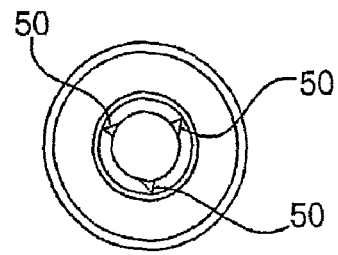
FIG. 3 is a cross-sectional view of the fastener taken along the line A-A in FIG. 1.
Figure 4:
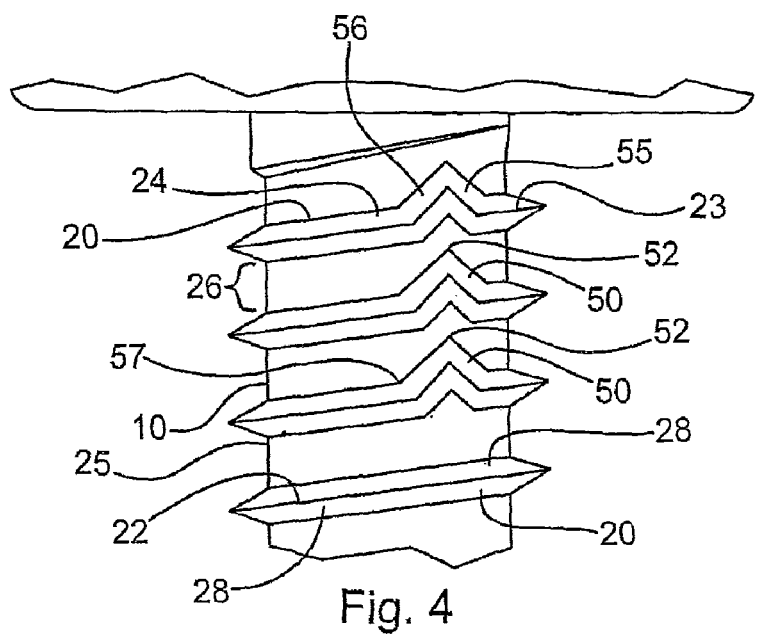
FIG. 4 is a partial front view of the fastener shown in FIG. 1.
Figure 5:
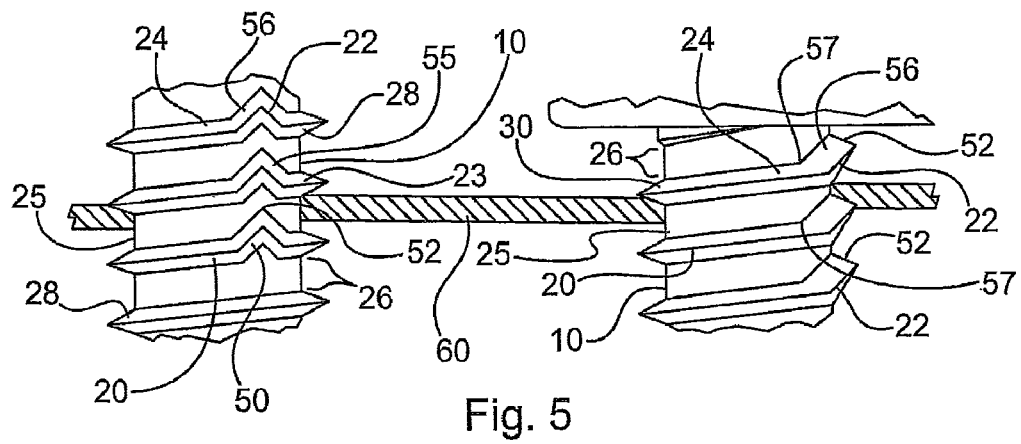
FIG. 5 is a partial front view of two of the fasteners shown in FIG. 1, showing the fasteners engaging a cross-section of thin gauge metal.

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific fasteners illustrated in the accompanying drawing figures and described herein are simply exemplary and should not be considered as limiting.

In one embodiment, shown in FIGS. 1-7, a fastener 1 including an elongated body 10 with a first end 11 and a second end 12, and a helical thread 20 formed on at least a portion of the elongated body 10 is provided. The helical thread 20 has a crest 22, a root 25, and flank portions 28. Further, the helical thread 20 has at least one protrusion 50 extending from the crest 22 and flank portions 28 toward the first end 11 of the elongated body 10. As more clearly shown in FIG. 5, each of the protrusions 50 has a peak 52 that extends to the root 25 of the thread 20. The peak 52 of each protrusion 50 has a height of at least 50 percent of a root length 26 measured from an intersection point 57 of the root 25 and the flank portion 28 closest to the first end 11 of the elongated body 10. Each protrusion 50 extending from the crest 22 and the flank portions 28 of the thread 20 has a first side 55 and a second side 56. The first side 55 of each protrusion 50 has an angle that is at least on the order of 90 degrees with respect to an upper portion 23 of the helical thread 20 adjacent to each protrusion 50. The second side 56 of each protrusion 50 has an angle that is at least on the order of 90 degrees with respect to a lower portion 24 of the helical thread 20 adjacent to each protrusion 50. In certain embodiments, as shown in FIGS. 1-7, each protrusion 50 is an inverted V-shaped extension of the crest 22 and flank portions 28 of the thread 20, and the peak 52 of each protrusion 50 is pointed, i.e., the peak 52 of each protrusion 50 has a ridge that extends from the crest 22 to the root 25 of the thread 20.

Figure 6:
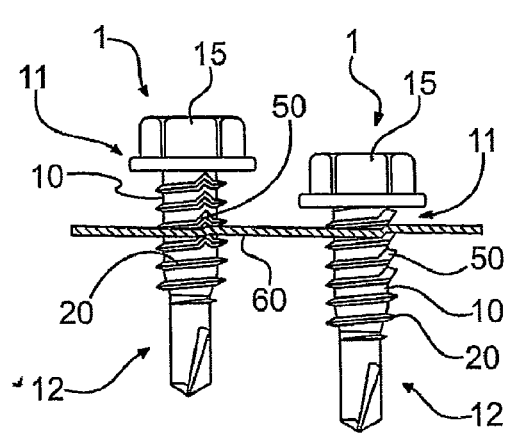
FIG. 6 is a front view of two of the fasteners shown in FIG. 1, showing the fasteners engaging thin gauge metal.
Figure 7:
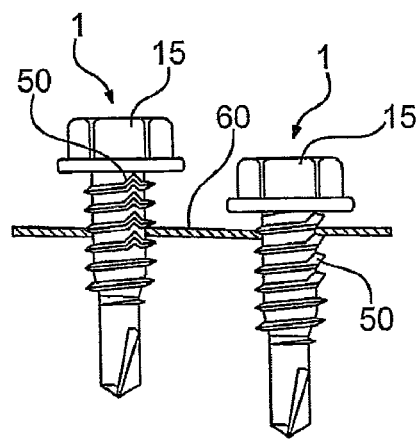
FIG. 7 is a front view of two of the fasteners shown in FIG. 1, showing the fasteners engaging a cross-section of thin gauge metal.

The helical thread 20 of the fastener 1, shown in FIGS. 1-7, is exemplary with three sets of three protrusions 50 with each protrusion 50 of a set being spaced 120 degrees apart on the helical thread 20. A first set of protrusions 50 is located on a first full thread 30 at the first end 11 of the elongated body 10 with the other sets of protrusions 50 located on the adjacent threads. The protrusions 50 of each set are aligned with corresponding protrusions 50 of the other sets located on adjacent threads, such that corresponding protrusions are aligned with one another along a longitudinal axis extending from the first end 11 to the second end 12 of the elongated body 10. The first end 11 of the elongated body 10 may include a head 15 for driving the fastener 1 into a work piece or material. Although the head 15 shown in FIG. 2 discloses a flanged hexagonal head for engagement with a driving tool, other types of drive arrangements known in the art may be used, including, but not limited to, slotted, Phillips, Allen, or hex-socket drive types. Further, as shown in FIGS. 1, 6, and 7, the second end 12 of the elongated body 10 may be provided with a drill point.

During installation of the fastener 1, the tapping torque and the clamping torque are increased by friction caused by the protrusions 50 of the helical thread 20 compressing the thin gauge metal 60 between the flank portions 28 of the helical thread 20. After the fastener is tightened and vibrations or other forces cause the fastener to start to loosen, the protrusions 50 of the thread 20 compress the thin gauge metal 60 between the flank portions 28 producing friction and thus increasing the back-out torque of the fastener 1.

Figure 8:
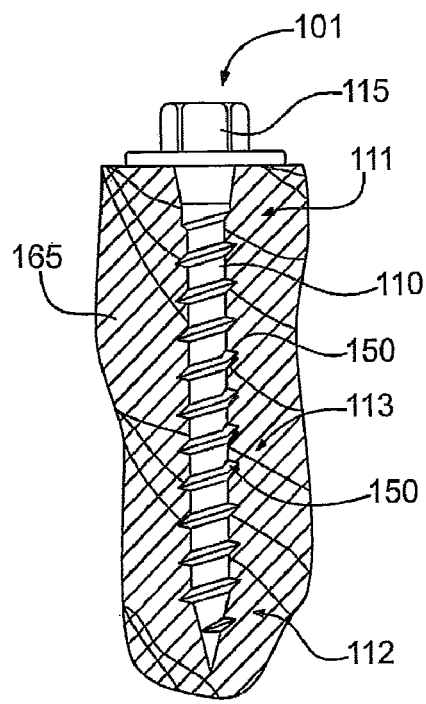
FIG. 8 is a front view of a threaded fastener pursuant to another embodiment, showing the fastener engaging a cross-section of wood.
Figure 9:
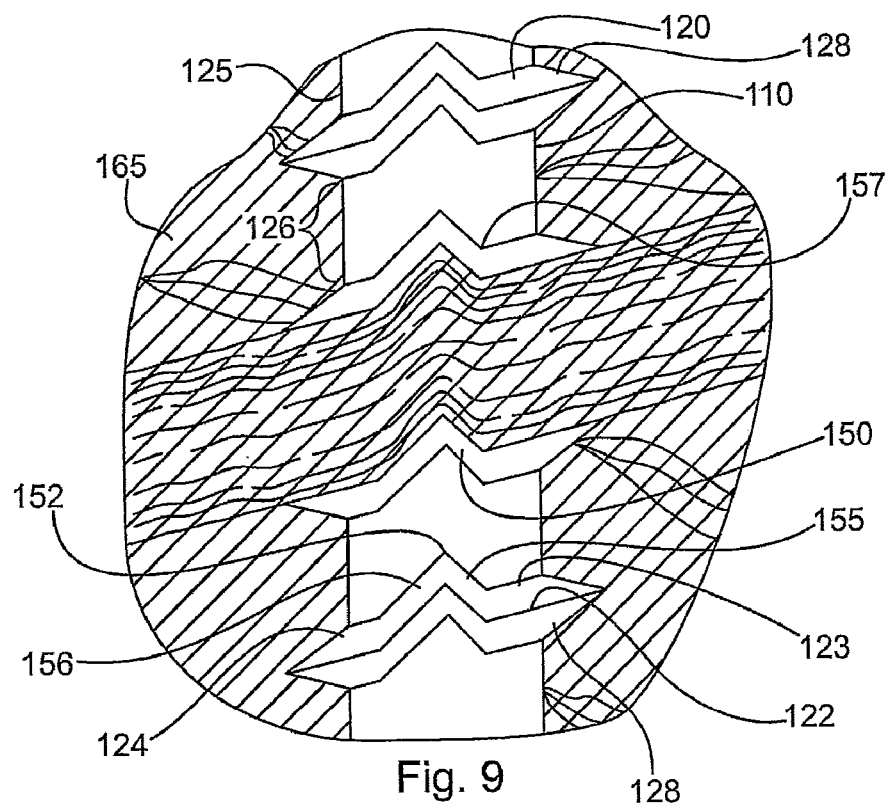
FIG. 9 is a partial front view of the fastener engaging wood as shown in FIG. 8.

In another embodiment, shown in FIGS. 8 and 9, a fastener 101 including an elongated body 110 with a first end 111 and a second end 112, and a helical thread 120 formed on at least a portion of the elongated body 110 is provided. The helical thread 120 has a crest 122, a root 125, and flank portions 128. Similar to the embodiment discussed above, the helical thread 120 has at least one protrusion 150 extending from the crest 122 and flank portions 128 toward the first end 111 of the elongated body 110. Each protrusion 150 extending from the crest 122 and the flank portions 128 of the thread 120 has a first side 155 and a second side 156. The first side 155 of each protrusion 150 has an angle that is at least on the order of 90 degrees with respect to an upper portion 123 of the helical thread 120 adjacent to each protrusion 150. The second side 156 of each protrusion 150 has an angle that is at least on the order of 90 degrees with respect to a lower portion 124 of the helical thread 120 adjacent to each protrusion 150.

In particular, the helical thread 120 of the fastener 101, shown in FIGS. 8 and 9, is exemplary with four protrusions 150 located on a middle portion 113 of the elongated body 110. The fastener 101 may also be provided with four sets of three protrusions 150 in this example, with each protrusion 150 within a set spaced 120 degrees apart from one another. The protrusions 150 may be aligned with the protrusions 150 located on adjacent threads of the helical thread 120, such that the protrusions 150 are aligned with one another along a longitudinal axis extending from the first end 111 to the second end 112 of the elongated body 110. The first end 111 of the elongated body 110 may include a head 115 for driving the fastener 101 into a work piece or material. Further, the second end 112 of the elongated body 110 may be tapered substantially to a point for engaging a material, such as wood 165 shown in FIGS. 8 and 9.

During installation of the fastener 101 into the wood material 165, more clearly shown in FIG. 9, the protrusions 150 redirect and compress the wood fibers, thereby increasing the tapping torque and the clamping torque of the fastener 101. After the fastener 101 is tightened and the wood material 165 beings to shrink, the protrusions 150 of the thread 120 must re-tap the wood, which increases the back-out torque of the fastener 101.

Figure 11:
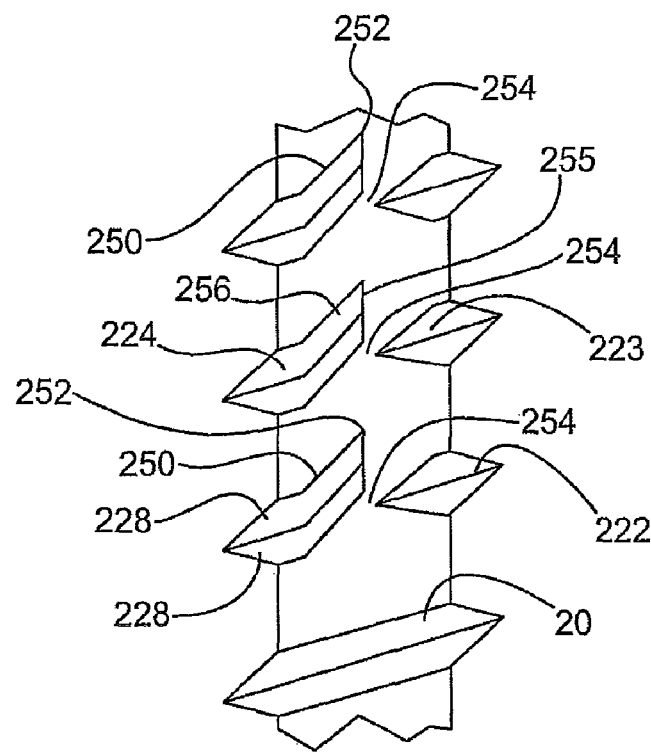
FIG. 11 is a partial front view of the fastener shown in FIG. 10.
Figure 10:
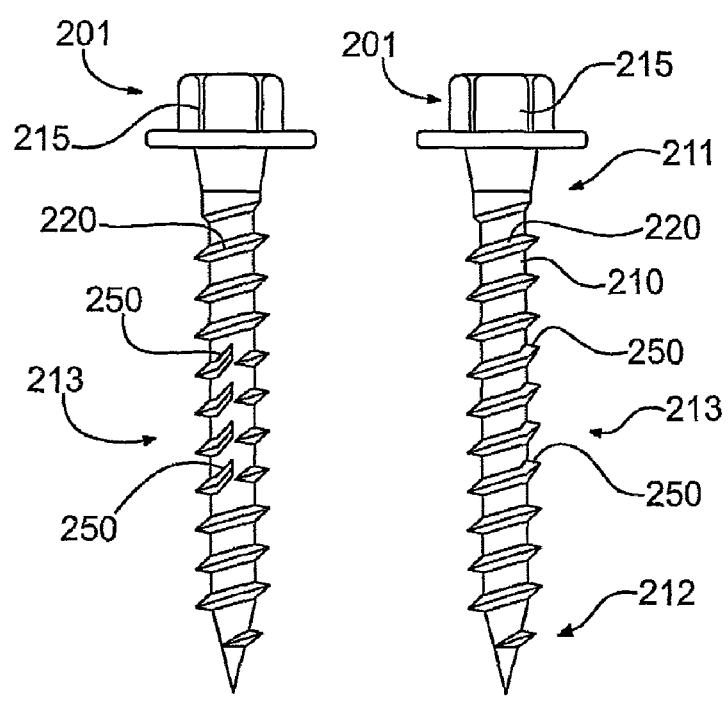
FIG. 10 is a front view of a threaded fastener pursuant to a further embodiment, showing the fastener at two different rotation angles.

In a further embodiment, shown in FIGS. 10-16, a fastener 201 including an elongated body 210 with a first end 211 and a second end 212, and a helical thread 220 formed on at least a portion of the elongated body 210 is provided. The helical thread 220 has a crest 222, a root 225, and flank portions 228. Similar to the embodiments discussed above, the helical thread 220 has at least one protrusion 250 extending from the crest 222 and flank portions 228 toward the first end 211 of the elongated body 210. However, as more clearly shown in FIGS. 11, 12, and 16, each of the protrusions 250 defines an interruption 254 in the helical thread 220. Also, each of the protrusions 250 has a peak 252 that extends to the root 225 of the thread 220. The peak 252 of each protrusion 250 has a height of at least 50 percent of a root length 226 measured from an intersection point 257 of the root 225 and the flank portion 228 closest to the first end 211 of the elongated body 210. Each protrusion 250 extending from the crest 222 and the flank portions 228 of the thread 220 has a first side 255 and a second side 256. The first side 255 of each protrusion 250 is located adjacent to the interruption 254 in the helical thread 220. Although the first side 255 of each protrusion 250 shown in FIG. 11 is substantially vertical, the first side 255 may be sloped or angled. The second side 256 of each protrusion 250 has an angle that is at least on the order of 90 degrees with respect to a lower portion 224 of the helical thread 220 adjacent to each protrusion 250.

The helical thread 220 of the fastener 201, shown in FIGS. 10-16, is provided with four protrusions 250 defining interruptions 254 located on a middle portion 213 of the elongated body 210. The fastener 201 may also be provided with four sets of three protrusions 250 in this example, with each protrusion 250 within a set spaced 120 degrees apart from one another. The protrusions 250 may be aligned with the protrusions 250 located on adjacent threads of the helical thread 220, such that the protrusions 250 and the interruptions 254 are aligned with one another along a longitudinal axis extending from the first end 211 to the second end 212 of the elongated body 210. The peak 252 of each protrusion 250 may be pointed. The first end 211 of the elongated body 210 may include a head 215 for driving the fastener 201 into a work piece or material. Further, the second end 212 of the elongated body 210 may be tapered substantially to a point for engaging a material, such as metal 260 or wood 265.

Figure 12:
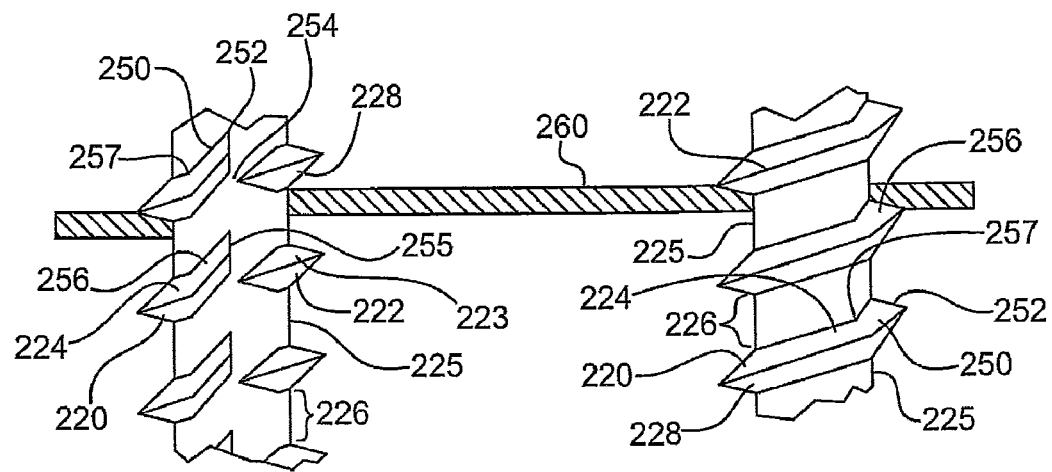
FIG. 12 is a partial front view of two of the fasteners shown in FIG. 10, showing the fasteners engaging a cross-section of metal.
Figure 13:
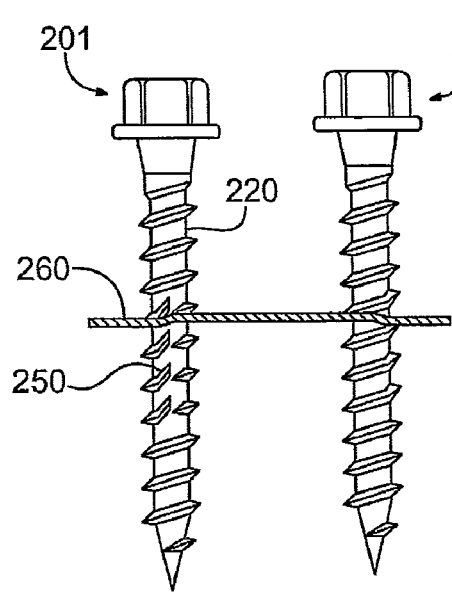
FIG. 13 is a front view of two of the fasteners shown in FIG. 10, showing the fasteners engaging metal.
Figure 14:
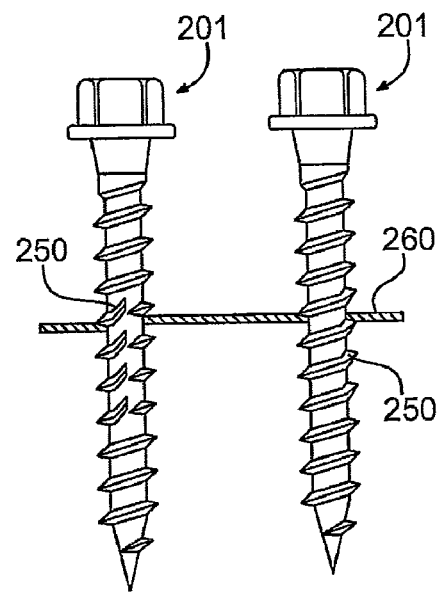
FIG. 14 is a front view of two of the fasteners shown in FIG. 10, showing the fasteners engaging a cross-section of metal.
Figure 15:
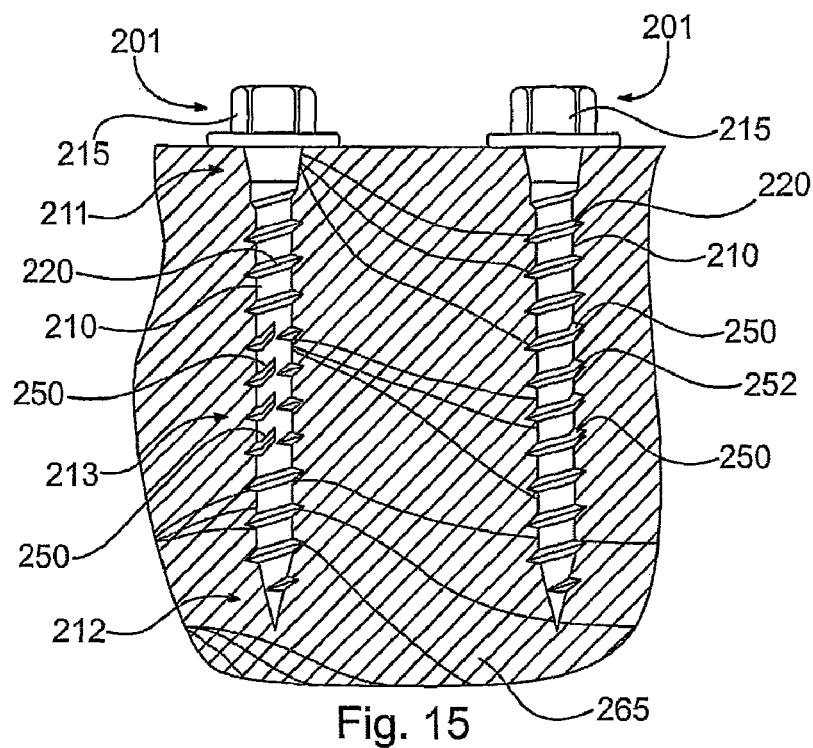
FIG. 15 is a front view of two of the fasteners shown in FIG. 10, showing the fasteners engaging a cross-section of wood.
Figure 16:
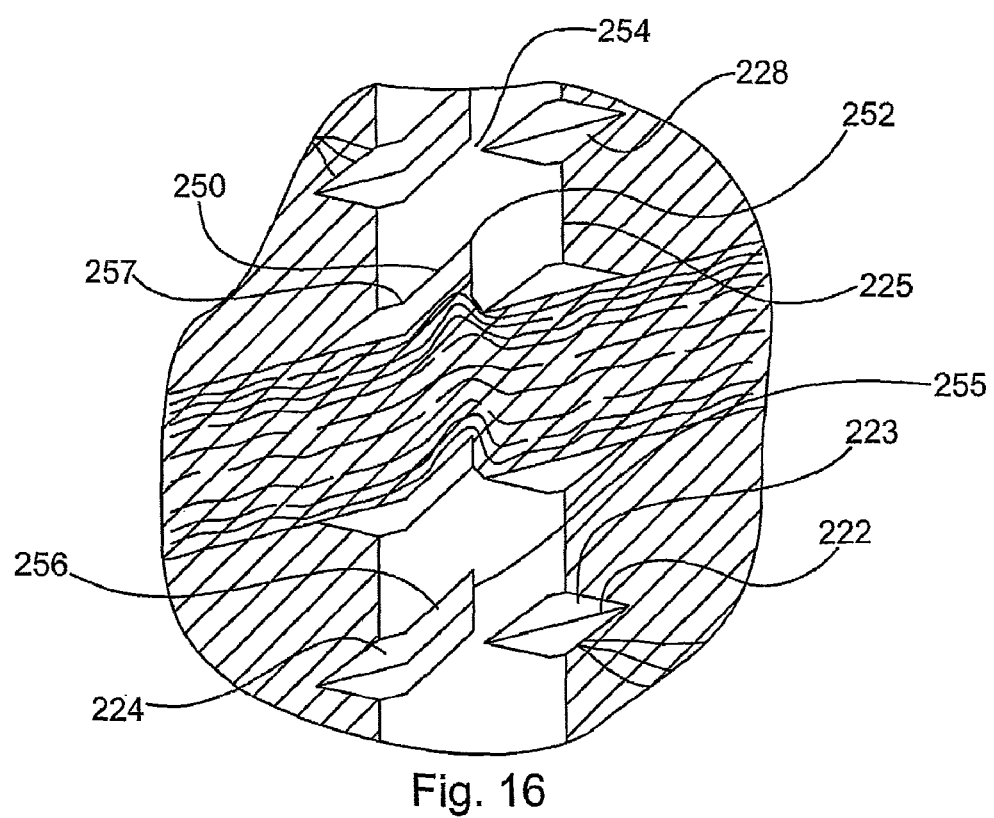
FIG. 16 is a partial front view of the fastener shown in FIG. 10, showing the fastener engaging a cross-section of wood.

During installation of the fastener 201 into a metal material 260, shown in FIGS. 12-14, the tapping torque and the clamping torque are increased by friction caused by the protrusions 250 of the helical thread 220 compressing the thin gauge metal 260 between the flank portions 228 of the helical thread 220. After the fastener is tightened and vibrations or other forces cause the fastener to start to loosen, the protrusions 250 of the thread 220 compress the thin gauge metal 260 between the flank portions 228 producing friction and thus increasing the back-out torque of the fastener 201. During installation of the fastener 201 into a wood material 265, more clearly shown in FIGS. 15 and 16, the protrusions 250 redirect and compress the wood fibers, thereby increasing the tapping torque and the clamping torque of the fastener 201. After the fastener 201 is tightened and the wood material 265 beings to shrink, the protrusions 250 of the thread 220 must re-tap the wood 265, which increases the back-out torque of the fastener 201.

In yet another embodiment, shown in FIGS. 17-19, a fastener 301 including an elongated body 310 with a first end 311 and a second end 312, and a helical thread 320 formed on at least a portion of the elongated body 310 is provided. The helical thread 320 has a crest 322, a root 325, and flank portions 328. Similar to the embodiments discussed above, the helical thread 320 has at least one protrusion 350 extending from the crest 322 and flank portions 328 toward the first end 311 of the elongated body 310.

As more clearly shown in FIG. 18, each of the protrusions 350 defines an interruption 354 in the helical thread 320. Each of the protrusions 350 has a peak 352 that extends to the root 325 of the thread 320. The peak 352 of each protrusion 350 has a height of at least 50 percent of a root length 326 measured from an intersection point 357 of the root 325 and the flank portion 328 closest to the first end 311 of the elongated body 310. Each protrusion 350 extending from the crest 322 and the flank portions 328 of the thread 320 has a first side 355 and a second side 356. The first side 355 of each protrusion 350 is located adjacent to the interruption 354 in the helical thread 320. Although the first side 355 of each protrusion 350 shown in FIG. 18 is substantially vertical, the first side 355 may be sloped or angled. The second side 356 of each protrusion 350 has an angle that is at least on the order of 90 degrees with respect to a lower portion 324 of the helical thread 320 adjacent to each protrusion 350. The fastener 301 further includes at least one downward protrusion 370, which extends from the crest 322 and flank portions 328 toward the second end 312 of the elongated body 310. The downward protrusion 370 has a peak 372 that extends to the root 325 of the thread 320. As shown in FIGS. 17-19, the peak 352 of each protrusion 350 and the peak 372 of each downward protrusion 370 may be pointed The fastener 301, shown in FIGS. 17-19, may include three protrusions 350 defining interruptions 354 located on a middle portion 313 of the elongated body 310. The fastener 301 may also be provided with three sets of two protrusions 350 in this example, with each protrusion 350 within a set spaced 180 degrees apart from one another. The protrusions 350 may be aligned with the protrusions 350 located on adjacent threads of the helical thread 320, such that the protrusions 350 and the interruptions 354 are aligned with one another along a longitudinal axis extending from the first end 311 to the second end 312 of the elongated body 310. The downward protrusion 370 may be provided on the last full thread 335 of the helical thread 320. The fastener 301 may be provided with two downward protrusions 370 spaced 180 degrees apart from one another. The first end 311 of the elongated body 310 may include a head 315 for driving the fastener 301 into a work piece or material. Further, the second end 312 of the elongated body 310 may be tapered substantially to a point for engaging a material, such as metal or wood.

During installation of the fastener 301 into a material, the downward protrusion 370 engages the material and helps prevent the formation of burrs in the material. Further, the tapping torque and the clamping torque are increased by friction caused by the protrusions 350 of the helical thread 320 compressing the material between the flank portions 328 of the helical thread 320. After the fastener is tightened, the protrusions 350 of the thread 320 compress the material between the flank portions 328 producing friction and thus increasing the back-out torque of the fastener 301.

While certain embodiments of the threaded fastener were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A fastener comprising:
   an elongated body having a first end and a second end;
   a head located at the first end of the elongated body;
   a helical thread formed on at least a portion of the elongated body, the thread comprising a crest, a root, and flank portions; and
   at least one protrusion extending from the crest and flank portions toward the first end of the elongated body,
   wherein the at least one protrusion is an axially extending V-shape of the crest, flank portions and root of the helical thread with a peak of the at least one protrusion having a ridge that extends from the crest to the root of the thread.

2. The fastener as claimed in claim 1, wherein the peak of the at least one protrusion has a height of at least 50 percent of a root length.

3. The fastener as claimed in claim 1, wherein the at least one protrusion has a first side and a second side, the first side having an angle of at least about 90 degrees with respect to an upper portion of the helical thread adjacent to the at least one protrusion, the second side having an angle of at least about 90 degrees with respect to a lower portion of the helical thread adjacent to the at least one protrusion.

4. The fastener as claimed in claim 1, wherein the helical thread includes a plurality of protrusions spaced equally apart around the circumference of the elongated body on a first full thread beginning at the first end of the elongated body.

5. The fastener as claimed in claim 1, wherein the helical thread includes at least one set of protrusions, the at least one set having a plurality of protrusions spaced equally apart around the circumference of the elongated body.

6. The fastener as claimed in claim 5, wherein a first set of protrusions is located on a first full thread at the first end of the elongated body with second and third sets of protrusions located on adjacent threads.

7. The fastener as claimed in claim 6, wherein each protrusion of each set is aligned with a corresponding protrusion of the other sets of protrusions, such that corresponding protrusions are aligned with a longitudinal axis extending from the first end of the elongated body to the second end of the elongated body.

* * * * *

UNITED STATES PATENT AND TRADEMARK OFFICE
CERTIFICATE OF CORRECTION

| | | |
|---|---|---|
| PATENT NO. | : 7,963,732 B2 | |
| APPLICATION NO. | : 12/108575 | |
| DATED | : June 21, 2011 | |
| INVENTOR(S) | : Joseph Edward Stager | |

It is certified that error appears in the above-identified patent and that said Letters Patent is hereby corrected as shown below:

First Page, Column 1, U.S. Patent Documents, Line 2, "MaMahon" should read -- McMahon --

Signed and Sealed this
First Day of November, 2011

David J. Kappos
*Director of the United States Patent and Trademark Office*